UNITED STATES PATENT OFFICE.

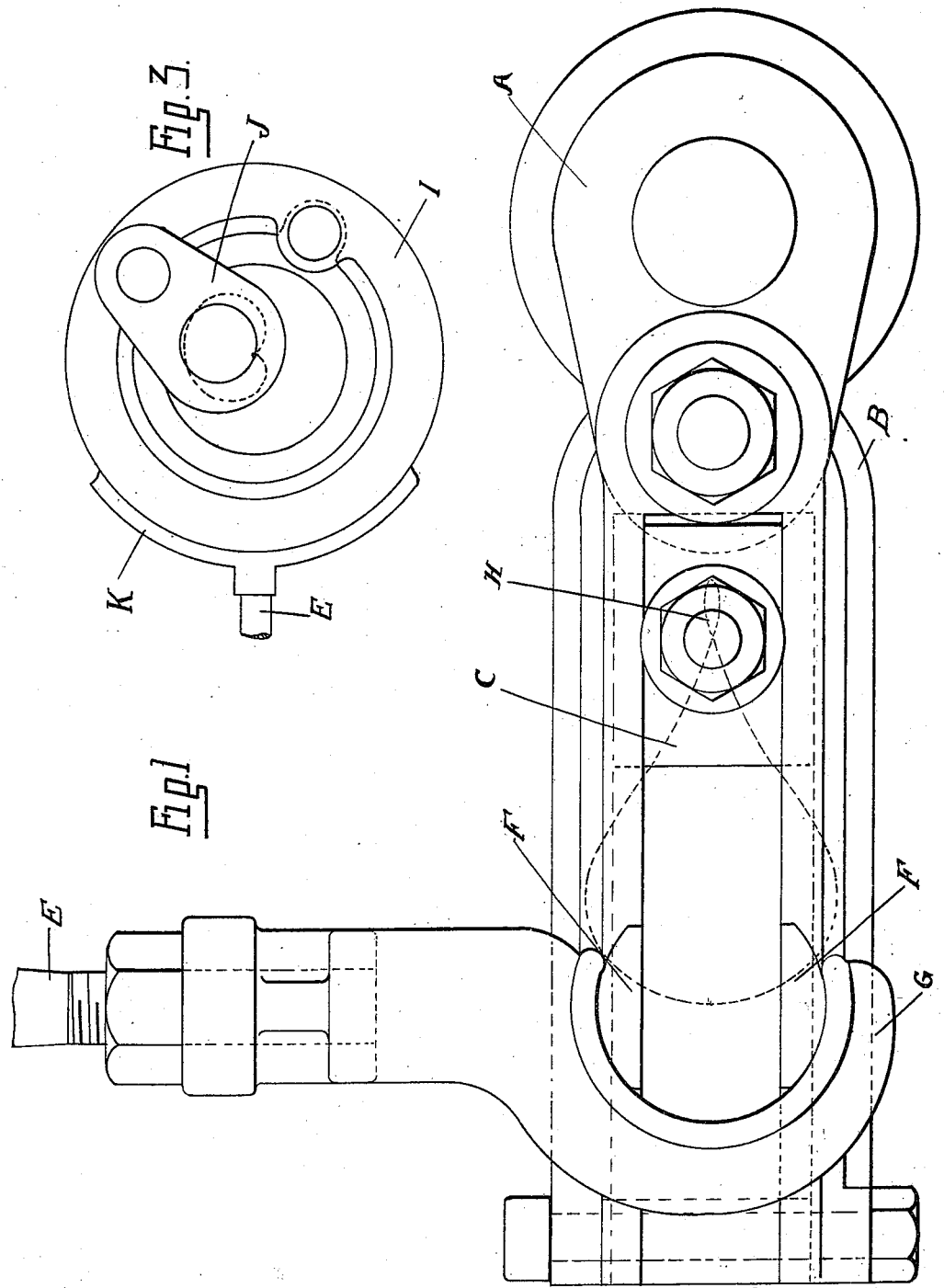

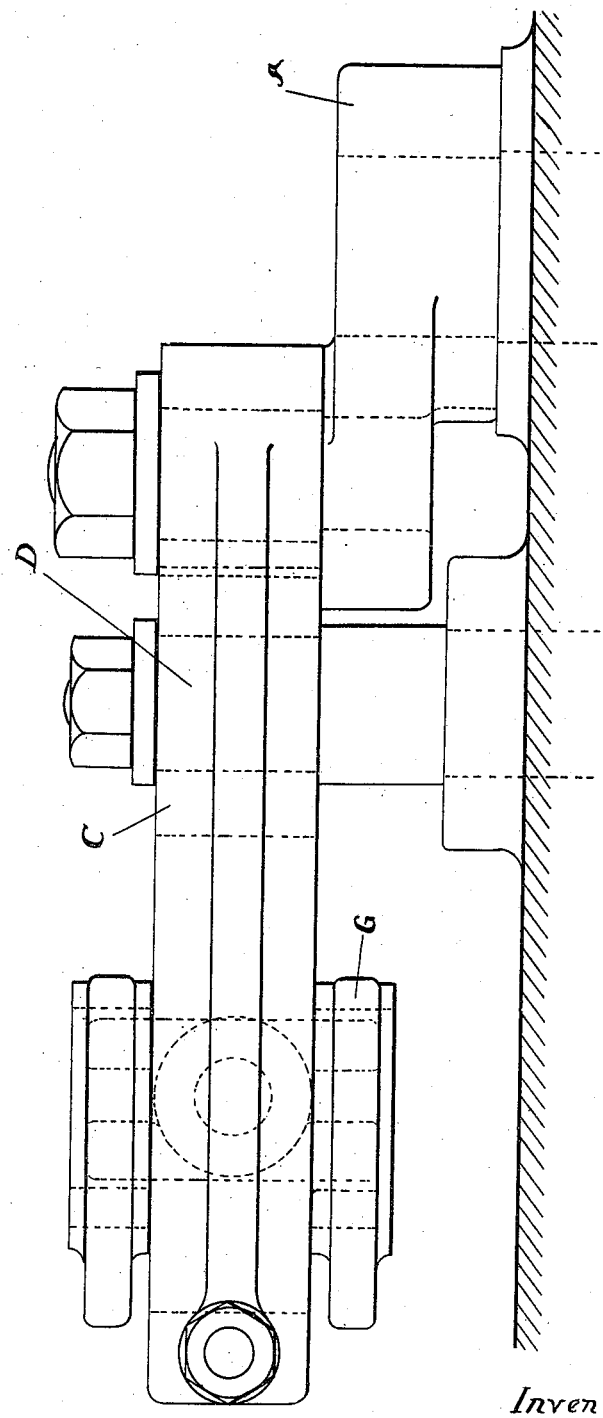

NORMAN T. HARRINGTON, OF LANSING, MICHIGAN.

VALVE-GEAR FOR EXPLOSION-ENGINES.

975,234.  Specification of Letters Patent.  Patented Nov. 8, 1910.

Application filed January 20, 1908. Serial No. 411,737.

*To all whom it may concern:*

Be it known that I, NORMAN T. HARRINGTON, a citizen of the United States of America, residing at Lansing, in the county of Ingham and State of Michigan, have invented certain new and useful Improvements in Valve-Gear for Explosion-Engines, of which the following is a specification, reference being had therein to the accompanying drawings.

My invention relates to valve gears particularly designed for use with explosion engines of the four-cycle type, and the invention consists in the peculiar construction of a positively connected system of levers for translating the continuous rotation of the crank into intermittent reciprocatory movement of the valve actuating member.

In the drawings; Figure 1 is a side elevation of my improved valve gearing; Fig. 2 is an end elevation thereof; and Fig. 3 is a diagrammatic view illustrating a modification.

My improvement relates more particularly to that type of valve gears in which the reciprocatory member is connected to a pivot which is caused to travel through a double looped orbit by suitable actuating connections with a continuously rotating crank. With the present invention this movement is effected through the medium of a pitman connection with the crank which is slidably connected to a fixed pivot, and to which the reciprocatory valve actuating rod is pivotally connected. As shown A is a revoluble crank suitably driven from the main crank of an engine preferably a two-to-one gearing (not shown).

B is a pitman preferably comprising a strap member having parallel arms embracing a slidable block or head C. One end of the member B is provided with a journal bearing for engaging the crank, while the member C engages a stationary pivot pin D. Thus in the rotation of the crank the pitman B is reciprocated upon the block C and the latter swings upon the pin D.

E is a reciprocatory valve actuating rod. This is pivotally connected to the opposite end of the pitman B and preferably at a point which crosses the center of the stationary pin D during the movement of the pitman. To permit of this movement segmental bearings F are formed upon opposite sides of the strap member B, being cut away to permit of sliding movement of the block C thereby. These segmental members are engaged by a segmental bearing G upon the rod E, this preferably being bifurcated to embrace bearings upon opposite sides of the pitman B. The bearings G are also cut away sufficiently to permit the passage of the pin D between the segments F.

With the construction as described, the rotation of the crank A will cause the reciprocation of the pitman B, carrying with it a segmental bearing F and rod E. By reason of the fact that the center of the bearing F passes the center of the pin D, the former is caused to trace a double loop-shaped orbit, as indicated by dotted lines, and the portion H of this loop which is above the center of the pin D is of very limited width. At the same time a considerable angular movement of the crank A is necessary to effect the tracing of this small loop H, during which movement the rod E is moved transversely, but with very little longitudinal movement. On the other hand, the moment the center of the pin D is crossed and the upward movement of the pitman, the rod E is reciprocated longitudinally and upon opposite sides of its neutral position. This movement is especially advantageous for a valve gear for explosion engines of the four-cycle type, as the time in which the small loop is traced is sufficient for the compression stroke of the engine, and permits both inlet and exhaust valves to remain closed.

As a modification of the construction above described, a construction such as illustrated diagrammatically in Fig. 3 may be employed in which, in place of the pitman B, a member I is used which is pivotally connected to the crank A at one point and at a different point to a second crank J, which is eccentric to the crank A. The member I is circular and engages a strap K connected with the valve actuating rod E, and by reason of the eccentricity of the two cranks the center of the member I will trace a double looped orbit, but in this case the smaller loop will be within the larger loop, as illustrated by dotted lines.

What I claim as my invention is:

1. A valve actuating mechanism comprising a continuously rotating crank, a member connected to and actuated by said crank, means engaging said member for determining the movement thereof so as to cause a point therein to traverse a double loop-shaped orbit, the width of one of said loops being relatively small, and a member connected concentrically to said point and extending substantially at right angles to the longitudinal axis of said loops whereby it is reciprocated during the trace of the longitudinal loop, and remains and is substantially free from longitudinal movement in a central or neutral position during the trace of the small loop.

2. A valve operating mechanism comprising a continuously rotating crank, a member connected to and actuated by said crank, means determining the movement of said member to cause a point therein to trace a double loop symmetrical to a common axis, the width of one of said loops being relatively small, and a member pivotally connected to said crank actuated member concentric to said point and extending at substantially right angles to the common axis of said loops whereby it is reciprocated longitudinally and oppositely from the neutral position during the trace of the longitudinal loop, and remains substantially in its neutral position during the trace of the small loop.

3. A valve operating mechanism comprising a continuously rotating crank, a pitman connected to and actuated by said crank, a stationary pivot slidably engaging said pitman, a valve operating rod connected to said pitman and extending at substantially right angles to the plane of the axes of said crank and stationary pivot, the point of connection of said rod to said pitman being so located as to pass the center of the stationary pivot during the rotation of said crank.

4. A valve operating mechanism comprising a continuously rotating crank, a longitudinally slotted pitman connected with and operated by said crank, a stationary pivot slidably engaging said slot in said pitman, segmental bearings on opposite sides of said slot, and a rod having an open segmental bearing engaging said bearing on said pitman and adapted during the movement of said pitman to have its center moved past the center of said stationary pivot.

5. A valve operating mechanism comprising a continuously rotating crank, a pitman connected to and operated by said crank and being longitudinally slotted, a slidable bearing engaging said longitudinal slot, a stationary pivot engaging said slidable bearing, pivoted segments upon said pitman on opposite sides of said slot, and a bifurcated rod having open segmental bearings engaging said pivoted segments and passing in the movement of said pitman to embrace said stationary pivot.

In testimony whereof I affix my signature in presence of two witnesses.

NORMAN T. HARRINGTON.

Witnesses:
NELLIE KINSELLA,
JAMES P. BARRY.